(12) United States Patent
Itoko et al.

(10) Patent No.: US 11,971,910 B2
(45) Date of Patent: Apr. 30, 2024

(54) TOPIC NAVIGATION IN INTERACTIVE DIALOG SYSTEMS

(71) Applicant: INTERNATIONAL BUSINESS MACHINES CORPORATION, Armonk, NY (US)

(72) Inventors: Toshinari Itoko, Kanagawa (JP); Toshiro Takase, Chiba-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 766 days.

(21) Appl. No.: 16/166,777

(22) Filed: Oct. 22, 2018

(65) Prior Publication Data
US 2020/0125672 A1 Apr. 23, 2020

(51) Int. Cl.
*G06F 16/31* (2019.01)
*G06F 16/332* (2019.01)

(52) U.S. Cl.
CPC ........ *G06F 16/313* (2019.01); *G06F 16/3326* (2019.01); *G06F 16/3329* (2019.01)

(58) Field of Classification Search
None
See application file for complete search history.

(56) References Cited

U.S. PATENT DOCUMENTS

| | | | | |
|---|---|---|---|---|
| 5,920,318 A * | 7/1999 | Salvatore, Jr. | .......... | G01S 13/91 345/418 |
| 7,739,294 B2 * | 6/2010 | Wissner-Gross | ..... | G06F 16/958 707/765 |
| 7,987,091 B2 * | 7/2011 | Aoyama | ................. | G10L 15/22 704/245 |
| 8,838,613 B1 * | 9/2014 | Thakur | ................... | G06F 16/35 707/748 |
| 8,880,406 B2 * | 11/2014 | Santos-Lang | ........... | G10L 15/22 704/275 |
| 9,594,824 B2 * | 3/2017 | Halan | .................... | G06F 16/288 |
| 10,733,614 B2 * | 8/2020 | Sapoznik | ................ | G06F 40/35 |
| 10,949,616 B1 * | 3/2021 | Shenoy | ................... | G06F 40/30 |

(Continued)

OTHER PUBLICATIONS

Yuka Kobayashi et al., Development of Dialogue Interface for Elderly People Voice Dialogue Interface Capable of Listening Actively, 010 5th ACM/IEEE International Conference on Human-Robot Interaction (HRI), Osaka, Mar. 2010.

(Continued)

*Primary Examiner* — Mark D Featherstone
*Assistant Examiner* — Navneet Gmahl
(74) *Attorney, Agent, or Firm* — Tutunjian & Bitetto, P.C.; Robert Richard Aragona (57) ABSTRACT

Methods and systems for gathering information from a user include identifying an origin topic and a target topic. A path from the origin topic to the target topic is determined. The path includes a set of bridging topics, where each bridging topic in the path is within a threshold distance in a semantic space from a previous topic and a subsequent topic. An interactive conversation is conducted with the user, introducing each topic in the path until the target topic has been reached. At least one predetermined piece of information relating to a user response to the target topic is recorded.

18 Claims, 7 Drawing Sheets

(56) References Cited

U.S. PATENT DOCUMENTS

| | | | | |
|---|---|---|---|---|
| 2002/0133347 | A1* | 9/2002 | Schoneburg | G06F 40/30 704/E15.026 |
| 2003/0101151 | A1* | 5/2003 | Holland | G06N 3/004 706/45 |
| 2006/0179022 | A1* | 8/2006 | Holland | G06N 3/004 706/45 |
| 2006/0277045 | A1* | 12/2006 | Gleason | G10L 13/08 704/E13.011 |
| 2010/0223211 | A1* | 9/2010 | Johnson | G06Q 10/0637 706/11 |
| 2011/0307479 | A1* | 12/2011 | Yin | G06F 16/9535 707/728 |
| 2012/0233188 | A1* | 9/2012 | Majumdar | G06F 16/258 707/756 |
| 2012/0296637 | A1* | 11/2012 | Smiley | G06F 18/22 704/9 |
| 2013/0124449 | A1* | 5/2013 | Pinckney | G06N 20/00 706/52 |
| 2013/0290338 | A1* | 10/2013 | Lee | G06F 16/36 707/739 |
| 2014/0106318 | A1* | 4/2014 | Wright | G09B 7/00 434/219 |
| 2015/0074194 | A1* | 3/2015 | Schabes | H04L 51/52 709/204 |
| 2017/0032468 | A1* | 2/2017 | Wang | G06Q 40/123 |
| 2017/0069316 | A1* | 3/2017 | Makino | G10L 15/22 |
| 2017/0083510 | A1* | 3/2017 | Dixon | G06F 40/47 |
| 2017/0235824 | A1* | 8/2017 | Liu | G06Q 20/10 707/723 |
| 2017/0316777 | A1* | 11/2017 | Perez | G06F 40/169 |
| 2017/0351781 | A1* | 12/2017 | Alexander | G06F 16/3347 |
| 2017/0364520 | A1* | 12/2017 | Venkataraman | G06F 16/3329 |
| 2017/0372204 | A1* | 12/2017 | Sweeney | G06Q 30/0269 |
| 2018/0012231 | A1* | 1/2018 | Sapoznik | G06F 16/3329 |
| 2018/0129752 | A1* | 5/2018 | Blomberg | G06F 16/334 |
| 2018/0144738 | A1* | 5/2018 | Yasavur | G10L 15/1822 |
| 2018/0150607 | A1* | 5/2018 | MacLeod | G16H 10/20 |
| 2018/0173999 | A1* | 6/2018 | Renard | G06K 9/6256 |
| 2018/0196796 | A1* | 7/2018 | Wu | G06N 5/022 |
| 2018/0341396 | A1* | 11/2018 | Yaseen | G10L 15/22 |
| 2018/0341632 | A1* | 11/2018 | Akkiraju | G06F 16/35 |
| 2019/0057143 | A1* | 2/2019 | Porter | G06Q 10/10 |
| 2019/0058793 | A1* | 2/2019 | Konig | H04M 3/5183 |
| 2019/0180743 | A1* | 6/2019 | Yoshida | G10L 15/02 |
| 2019/0182382 | A1* | 6/2019 | Mazza | G10L 15/26 |
| 2019/0333078 | A1* | 10/2019 | Bala | G06Q 30/0201 |
| 2019/0347668 | A1* | 11/2019 | Williams | G06N 5/046 |
| 2019/0354874 | A1* | 11/2019 | Shah | G06N 5/022 |
| 2020/0005153 | A1* | 1/2020 | Ramanath | G06N 3/04 |
| 2020/0151519 | A1* | 5/2020 | Anushiravani | G06K 9/6269 |
| 2020/0311145 | A1* | 10/2020 | Li | G06F 16/90344 |
| 2020/0409943 | A1* | 12/2020 | Diefenbach | G06F 16/3329 |
| 2021/0203623 | A1* | 7/2021 | Zhou | G06F 16/3329 |
| 2022/0365993 | A1* | 11/2022 | Voisin | G06F 18/214 |
| 2022/0391848 | A1* | 12/2022 | Maier | G06F 16/35 |

OTHER PUBLICATIONS

Tomas Mikolov et al., Efficient Estimation of Word Representations in Vector Space, Computer Science > Computation and Language, Sep. 2013.

Hiroaki Sugiyama et al., Open-domain Utterance Generation for Conversational Dialogue Systems using Web-scale Dependency Structures, Proceedings of the SIGDIAL 2013 Conference, Metz, France, Aug. 2013.

Graham Neubig et al., Answer Sentence Generation for Guiding Users to New Topics with Relationships between Words in Spoken Dialog Systems, Autumn Conference on Acoustical Society of Japan (ASJ), Sep. 2012.

* cited by examiner

TOPIC NAVIGATION IN INTERACTIVE DIALOG SYSTEMS

BACKGROUND

Technical Field

The present invention generally relates to computer dialog systems and, more particularly, to identifying bridging conversational topics between a current topic and a target topic.

Description of the Related Art

Computerized dialog agents are frequently used to collect information from users. These systems can, for example, ask a series of specific questions to help narrow down the user's problem and to identify the best person for the user to talk to for resolution. As natural language processing adapts, these dialog agents are increasingly able to accept natural language inputs from the user, enabling a more natural conversational style.

SUMMARY

A method for gathering information from a user includes identifying an origin topic and a target topic. A path from the origin topic to the target topic is determined. The path includes a set of bridging topics, where each bridging topic in the path is within a threshold distance in a semantic space from a previous topic and a subsequent topic. An interactive conversation is conducted with the user, introducing each topic in the path until the target topic has been reached. At least one predetermined piece of information relating to a user response to the target topic is recorded.

An interactive dialog system includes a path module that includes a processor configured to identify an origin topic and a target topic and to determine a path from the origin topic to the target topic. The path includes a set of bridging topics Each bridging topic in the path is within a threshold distance in a semantic space from a previous topic and a subsequent topic. A user interface is configured to conduct an interactive conversation with the user, introducing each topic in the path until the target topic has been reached, and to record at least one predetermined piece of information relating to a user response to the target topic.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention find natural conversational paths in a computerized dialog system to obtain information pertaining to predetermined topics. These "natural" conversational paths include topics of conversation that are relatively similar to the topics used immediately previous and immediately after. To reach a goal topic from a current topic, the present embodiments identify one or more bridging topics using "neighbor words" that are closer to the goal topic in a semantic space. By recursively finding intermediate points between the current topic and the goal topic, a set of bridging conversational topics can be identified that produce a natural path to the needed information without surprising conversational transitions.

Figure 1:
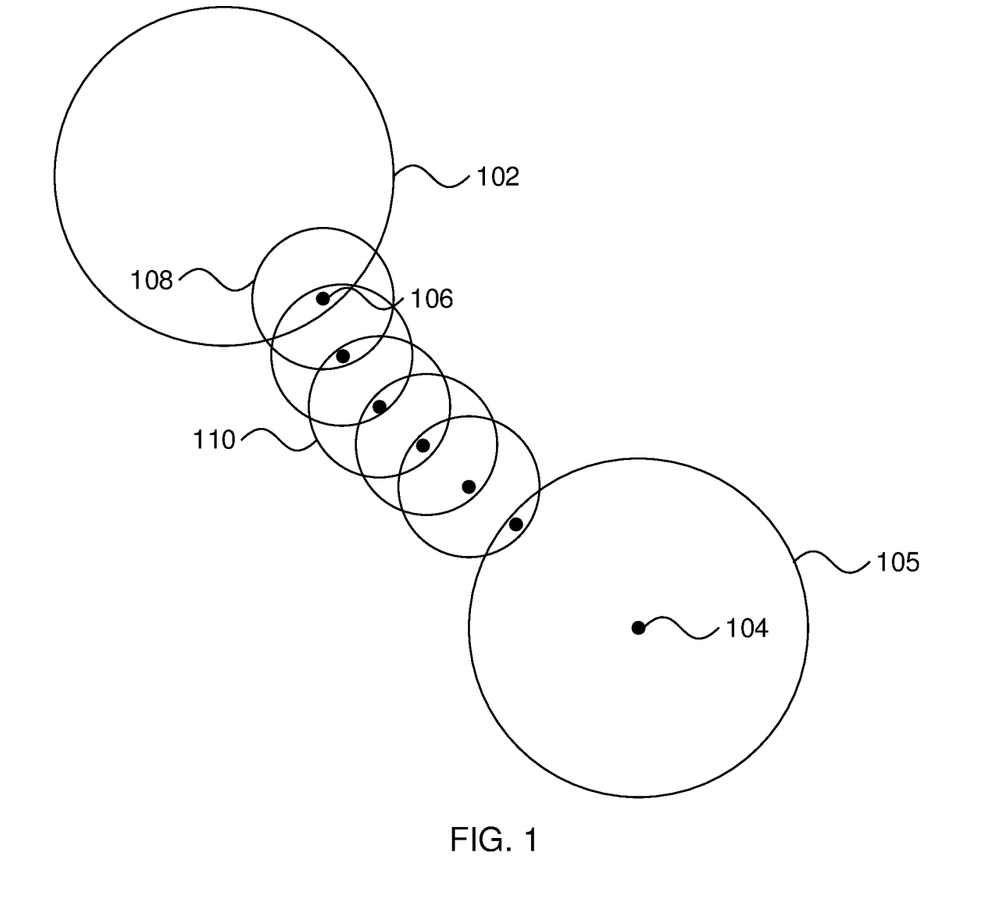
FIG. 1 is a diagram of a path of bridging topics between an origin topic and a target topic in a semantic space in accordance with an embodiment of the present invention.

Referring now to FIG. 1, a diagram is shown that depicts a bridging conversational path between topics. In this example, a computerized dialog agent seeks to reach goal topic 104 so that it can ask the user for questions relating to that topic. The last exchange included an utterance by the user relating to a current topic, broken down into a set of originating words 102. The goal topic 104 has an associated set of related words 105 that the dialog agent can use to move the conversation to the goal topic.

The words are represented as vectors in a vector space that encodes the semantic meaning of the words. Words can be embedded in this vector space by forming a vector using, for example, the word2vec tool, which uses a training corpus of text to identify how words relate to one another. The word2vec tool can use, for example, a "bag-of-word" model or a "skip-gram" model to identify relationships between words by their contexts in the corpus. Similarity between two word-vectors can be determined using any appropriate measure such as, e.g., cosine similarity, which determines a similarity value as the cosine of the angle between the two vectors. Thus, words that are close together in the vector space have meanings that are more similar to one another than words that are farther apart.

To create a conversational bridge between the current words 102 and the topics similar to the goal topic 105, the present embodiments recursively find bridging topics that are more similar to each. For example, a first attempt at creating a bridging path identifies a topic 106 roughly halfway between the current words 102 and the topics similar to the goal topic 105. Each identified bridging topic 106 has its own neighborhood 108 of related topics. Thus, if the neighborhood 108 of first bridging topic 106 does not include a word from the current words 102 and the topics similar to the goal topic 105, additional bridging topics 106 are identified with their own respective neighborhoods, until a complete path 110 is found to bridge from one topic to the next until the goal topic 104 has been reached.

The neighborhoods 108 described above relate to a degree of similarity. For example, the neighborhoods 108 can have a radius in the vector space that is defined by a similarity score with respect to the corresponding topic 106, such that all words above a threshold similarity score are considered to be within that topic's neighborhood.

To provide some specific examples, consider Table 1 below. Table 1 shows two sets of conversational paths from an origin topic to a target topic. The left column shows a set of one-stop paths, where a single bridging topic is selected, while the right column shows a set of two-stop paths, where two bridging topics between the same set of origin and target topics is shown. The two-stop path provides a substantially more natural progression of topics as compared to the one-stop path. This can be understood as showing a smaller distance between the respective topics in the semantic space.

TABLE 1

| One-stop path | Two-stop path |
| --- | --- |
| Sports->Jogging->Meal | Sports->Recreation->Barbecue->Meal |
| Golf->Yoga->Sleep | Golf->Jogging->Sunbathing->Sleep |
| Haiku->Autobiography->Marriage | Haiku->Poetry->Correspondence->Marriage |
| Cooking->Managing->Marriage | Cooking->Home cooking->Home->Marriage |
| Reading->Shopping->Housing | Reading->Office->Floor plan->Housing |

As a general matter, the vector representation of a word W is denoted herein as vec(W). The vector representation can be generated using the word2vec tool or any other appropriate tool for embedding a word in a vector space. The vectors vec(W) are normalized in magnitude and so all have a length of 1. The similarity between word W and W' is denoted as sim(W, W') and may be calculated as the cosine similarity between the vectors vec(W) and vec(W'), but it should be understood that any other appropriate similarity measure may be used instead. The neighborhood of a word W is denoted herein as neighbor(W) and is defined as the words having a similarity greater than a threshold similarity value $\varepsilon$.

Using this framework, there are three different conditions when attempting to find bridging topics. In the following examples, two words (A and B) are considered. In the first case, the first word A is in neighbor(B) and the second word B is in neighbor(A). It should be noted that, in embodiments that use cosine similarity to define the neighborhood, if a first word is in the neighborhood of a second word, the second word will also be in the neighborhood of the first word, but this does not necessarily hold true for other measures of similarity. In this event, no bridging topic between the two words is needed and the dialog agent can proceed directly between the two topics.

In the second case, where the words are not directly in one another's neighborhoods, but neighbor(A) and neighbor(B) have at least one word in common, a third word C is selected that maximizes the smaller of sim(A, C) and sim(B, C), essentially finding a balance in similarity between A and B. This operation finds a word C that is as close to equidistant between A and B as possible. C is then identified as a potential bridging topic between A and B, where the dialog agent can use C in a conversation to smooth the transition.

In the third case, where the neighborhoods of the two words are disjoint, then a pair of words X and Y are identified that are closer together than A and B. The words X and Y are selected from words that are near trisector points of the line between A and B, where trisector points divide the line into three equal parts. The line between A and B can be determined in at least two ways, a first example being defined as the arc between A and B on a sphere having a radius of 1 and the second example being defined as a line directly between A and B. The points M(A→B) and M(B→A) are defined by a sector of the arc between A and B represented herein as 2:r, where 2:1 indicates trisectors and higher values of r represent points closer to the origin topic. For example, M(A→B) is the point C on the line from A to B where the ratio of distances between A and C and between C and B is equal to 2/r. Thus, the value of M(A→B) and M(B→A) are the first indicated sector points in the path from one word to the next.

The set of common neighbors between each A and the point M(A→B) is represented herein as cn(A, M(A→B)) and is defined as neighbor(A)∩neighbor (M(A→B)). Similarly, the set of common neighbors between B and the point M(B→A) is represented as cn(B, M(B→A)) and is defined as neighbor(B)∩neighbor (M(B→A)).

Resolving the third case is performed recursively, with three different possibilities at each level of recursion. It should be noted that, if cn(A→B) were non-zero, then processing would not reach this point. In a first possibility, where both cn(A, M(A→B)) and cn(B, M(B→A)) are empty, then the next level of recursion is triggered. With each subsequent step, the value of r is incremented, moving the points considered by M to be closer to the origin topic.

In a second possibility, where neither cn(A, M(A→B)) nor cn(B, M(B→A)) is empty, then the best pair of bridging topics is selected. In some embodiments, the bridging topics X and Y are returned as:

$$[X,Y]=\mathrm{argmax}\{\min(\mathrm{sim}(A,X),\mathrm{sim}(X,Y),\mathrm{sim}(Y,B)) | X \in cn(A \rightarrow B), Y \in cn(B \rightarrow A)\}$$

In other embodiments, the bridging topics are returned as:

$$[X,Y]=\mathrm{argmax}\{\mathrm{sim}(X,Y) | X \in cn(A \rightarrow B), Y \in cn(B \rightarrow A)\}$$

In a third possibility, where only one of cn(A, M(A→B)) and cn(B, M(B→A)) is empty, then the empty set is set equal to its origin topic (e.g., cn(A, M(A→B)) is considered to be equal to {A}) and the above process is performed as if neither were empty.

The result is a set of topics that bridge the gap between the origin topic and the target topic. In the event that recursion was needed, each level of recursion will output a set of bridging topics, with the union of all of the bridging topics forming the path 110.

Figure 2:
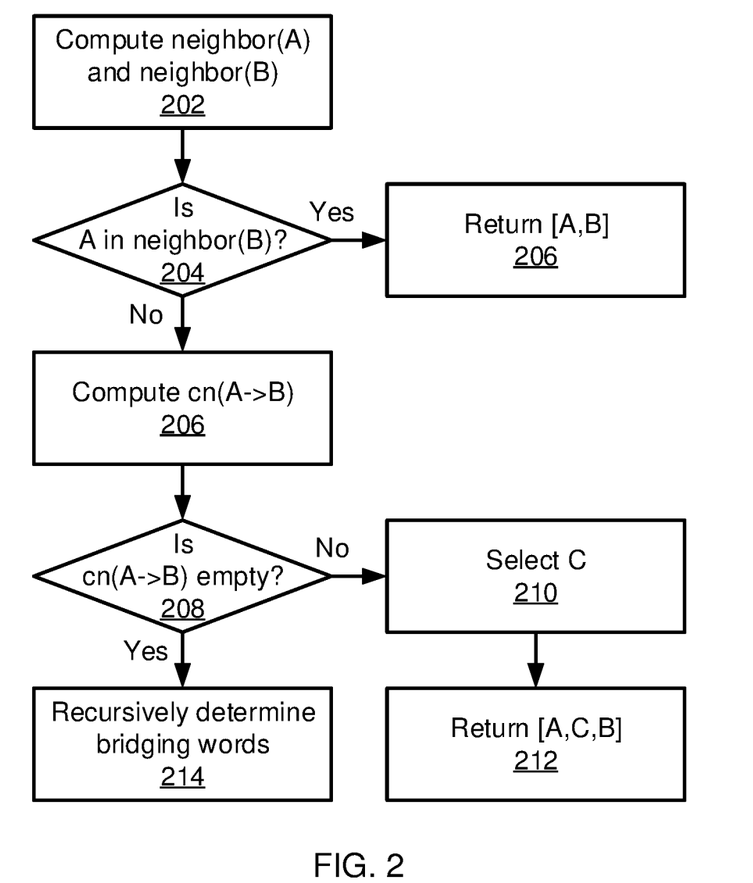
FIG. 2 is a block/flow diagram of a method for identifying bridging topics to form a path between the origin topic and the target topic in accordance with an embodiment of the present invention.

Referring now to FIG. 2, a method of finding a bridging path between two words, A and B, is shown. Block 202 computes neighbor(A) and neighbor(B), for example by finding words in the semantic space that are within a threshold distance of the respective words. Block 204 determines whether A is in neighbor(B) or, equivalently, whether B is in neighbor(A). If so, then block 206 returns [A,B] as the path, as a direct transition from A to B is possible.

If not, then block 206 computes cn(A→B) to find the common neighbors between the two words. If cn(A→B) is empty in block 208, then block 214 recursively determines bridging words as described above. If cn(A→B) is not empty, then block 210 selects a bridging word C as the word that maximizes the smaller of sim(A,C) and sim(B,C). Block 212 returns a topic path that includes the three points, [A,C,B].

Figure 3:
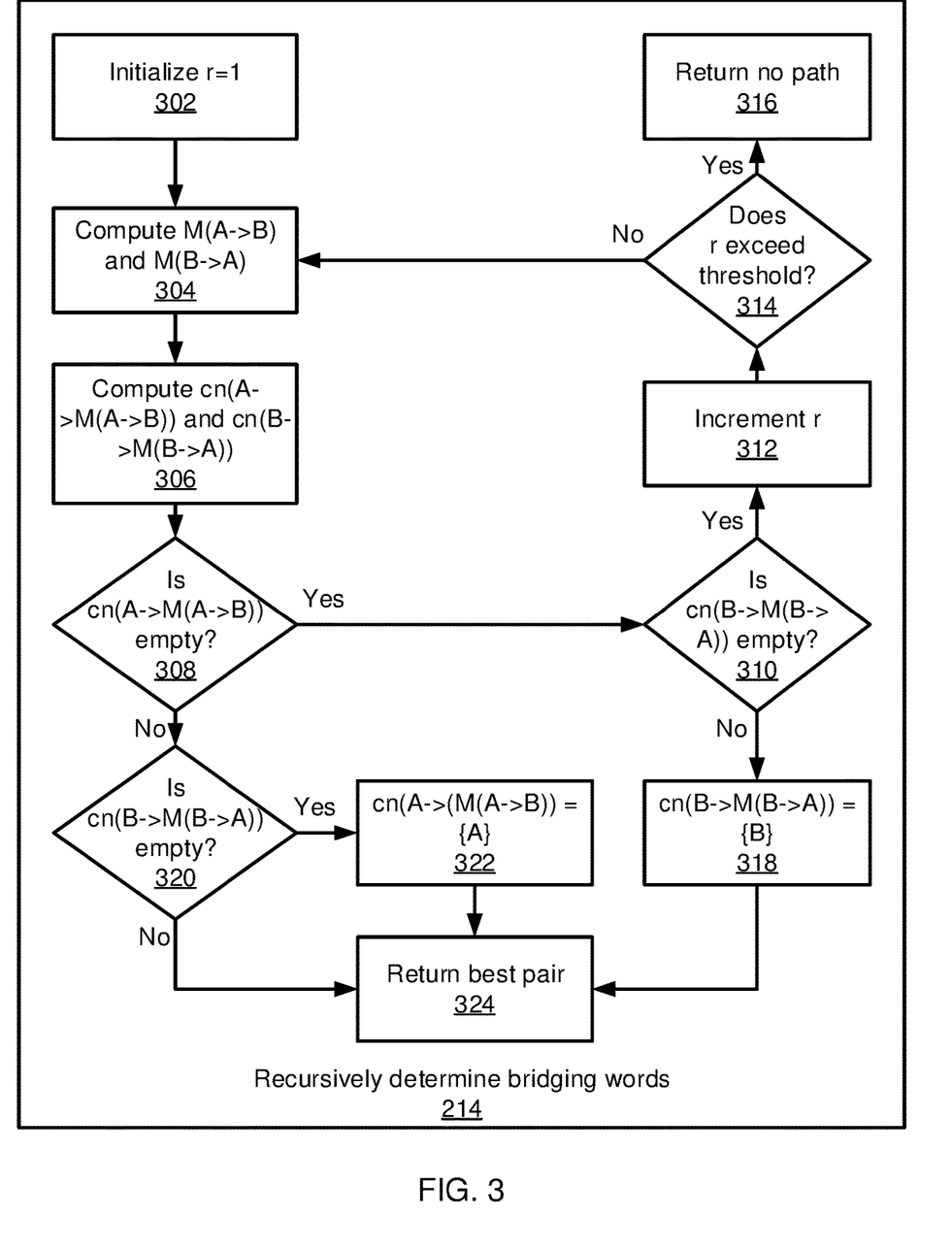
FIG. 3 is a block/flow diagram of a method for recursively determining bridging words when the origin topic and the target topic are far from one another in the semantic space in accordance with an embodiment of the present invention.

Referring now to FIG. 3, additional detail on recursively determining bridging words in block 214 is shown. Block 302 initializes the variable r to 1. Block 304 computes sector points M(A→B) and M(B→A) based on the present value of r. When r=1, these values will be trisector points between A and B. In subsequent levels of recursion, as the value of r changes, these points will move closer to the origin words (e.g., M(A→B) will move closer to A). Using these points, block 306 computes common neighbors between A and M(A→B) and between B and M(B→A).

Block 308 determines whether the set of common neighbors between A and M(A→B) is empty. If so, block 310 determines whether the set of common neighbors between B and M(B→A) is empty. If yes (i.e., in a scenario where both sets are empty), block 312 increments r to advance the level of recursion. Block 314 determines whether r has exceeded a threshold, which indicates that no further processing is permitted. If yes, block 316 returns that no path existed between A and B within a threshold number of topics. If r does not exceed the threshold, processing returns to block 304 to compute new sector points based on the new value of r. This process continues until at least one set of common neighbors is non-empty.

If block 310 finds that the set of common neighbors between B and M(B→A) is not empty, then block 318 sets the empty set cn(A→M(B→A))={A}. Block 324 returns a best pair of words, which represents the best two words in cn(A→M(A→B)) and cn(B→M(B→A)). As the levels of recursion resolve, the best points at each level is returned, with each level of recursion providing at least one point in the path.

If, in block 308, it is determined that cn(A→M(A→B)) is not empty, block 320 determines whether cn(B→M(B→A)) is empty. If not (i.e., in the circumstance where neither is empty), then block 324 returns the best path as described above, resolving the recursion to provide a complete path. If block 320 determines that cn(B→M(B→A)) is empty, then block 322 sets the empty set cn(B→M(B→A))={B}. Block 324 then returns the best path as described above.

Figure 4:
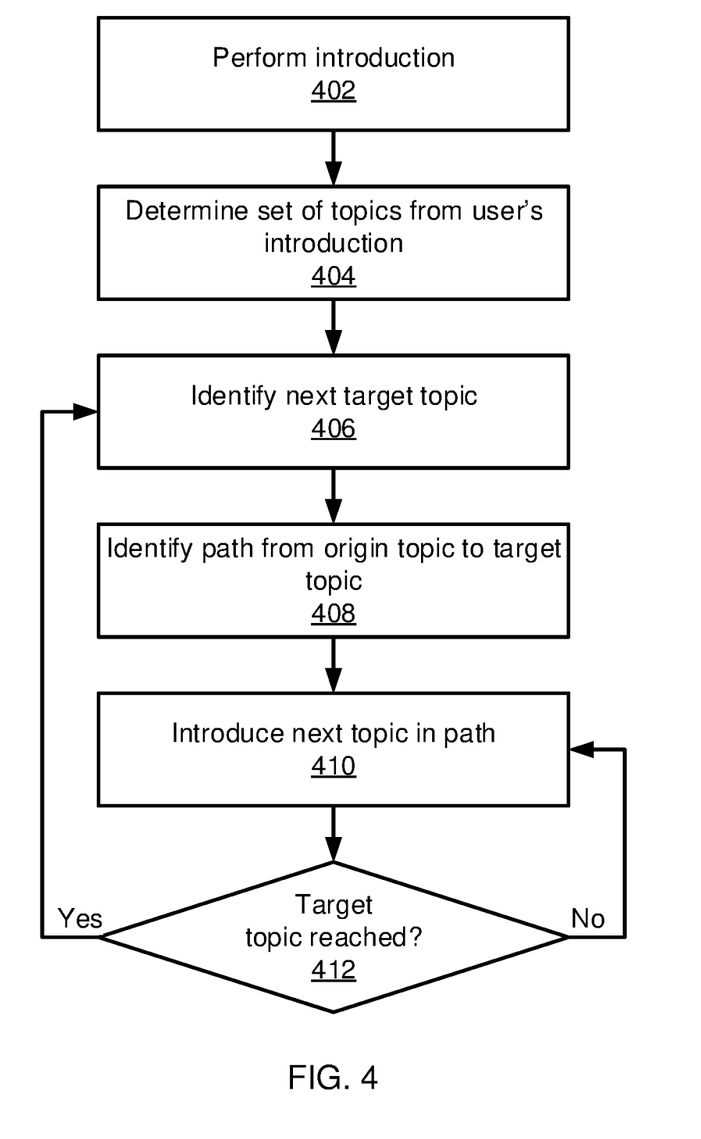
FIG. 4 is a block/flow diagram of a method for gathering information through natural, interactive dialog in accordance with an embodiment of the present invention.

Referring now to FIG. 4, a method of performing interview-based data collection is shown. Block 402 performs an introductory exchange with a user. This introductory exchange can be directed to gather identifying information and can, furthermore, provide topical cues to prompt an initial response from the user. The introduction can be as simple as, "Hello, what did you do today?" or can, alternatively, be a set of interactions. The user's response is recorded and broken into its component words, from which block 404 determines a set of topics and related words.

Block 406 identifies a next target topic. In some embodiments, the target topic may be dictated by a predetermined set of data that the system is to collect. In other embodiments, the target topic may be selected in whole, or in part, based on the user's last utterance and other real-time data, such as biometric measurements. For example, if the user's last utterance or present physical state indicates a particular health condition, the next topic may be selected to obtain more information about that health condition.

Block 408 identifies a path from the last topic to the target topic. As described above, the path can proceed directly to the target topic, if the target topic is sufficiently similar to the last topic, or the path can include one or more bridging topics, with each subsequent topic in the path being within a threshold distance from the previous topic in the path within a semantic space. Block 410 introduces a next topic in the path, conducting a conversation with the user by asking questions relating to the next topic.

Block 412 determines whether the target topic has been reached. If not, processing returns to block 410 and the next topic in the path is introduced. If the target topic has been reached, processing returns to block 406 to identify a next target topic. Alternatively, if the system has completed its information gathering, processing can halt and the information gathered from the user can be stored or processed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
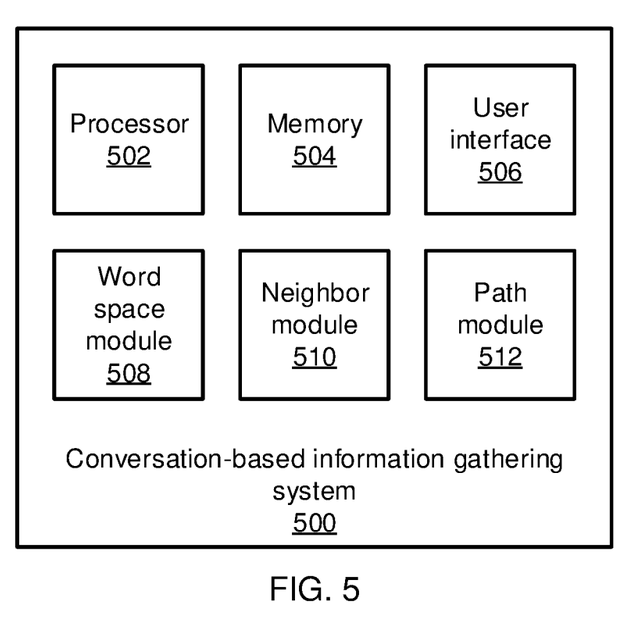
FIG. 5 is a block diagram of a conversation-based information gathering system in accordance with an embodiment of the present invention.

Referring now to FIG. 5, a conversation-based information gathering system 500 is shown. The system 500 includes a hardware processor 502 and a memory 504. A user interface 506 interacts with a user via text or speech to provide conversational inputs and to record the user's responses to memory 504. The system 500 also includes one or more functional modules that can, in some embodiments, be implemented as software that is stored in memory 504 and is executed by hardware processor 502. In other embodiments, the functional modules can be implemented as one or more discrete hardware components in the form of, e.g., application-specific integrated chips or field programmable gate arrays.

Word space module 508 performs operations to translate the words from a user's inputs into a semantic space that represents the words as vectors, where short distances between words in the semantic space correspond to similar meanings between the words. The word space module 508 performs functions such as finding words that are similar to a given word by, e.g., finding words that are within a threshold distance of the word. A neighbor module 510 uses the word space module 508 to identify words that are neighbors of a given word, for example words that are sufficiently similar, and finds common neighbors between two input words.

Path module 512 uses the word space module 508 and the neighbor module 510 to identify a conversational path between an origin word and a target word, with each step in the path being between words having a sufficient high similarity. The path module 512 provides the identified path to the user interface 506, which provides conversational outputs to the user relating to each of the topics in the identified paths, providing a natural progression of topics from the origin target to the target topic.

Figure 6:
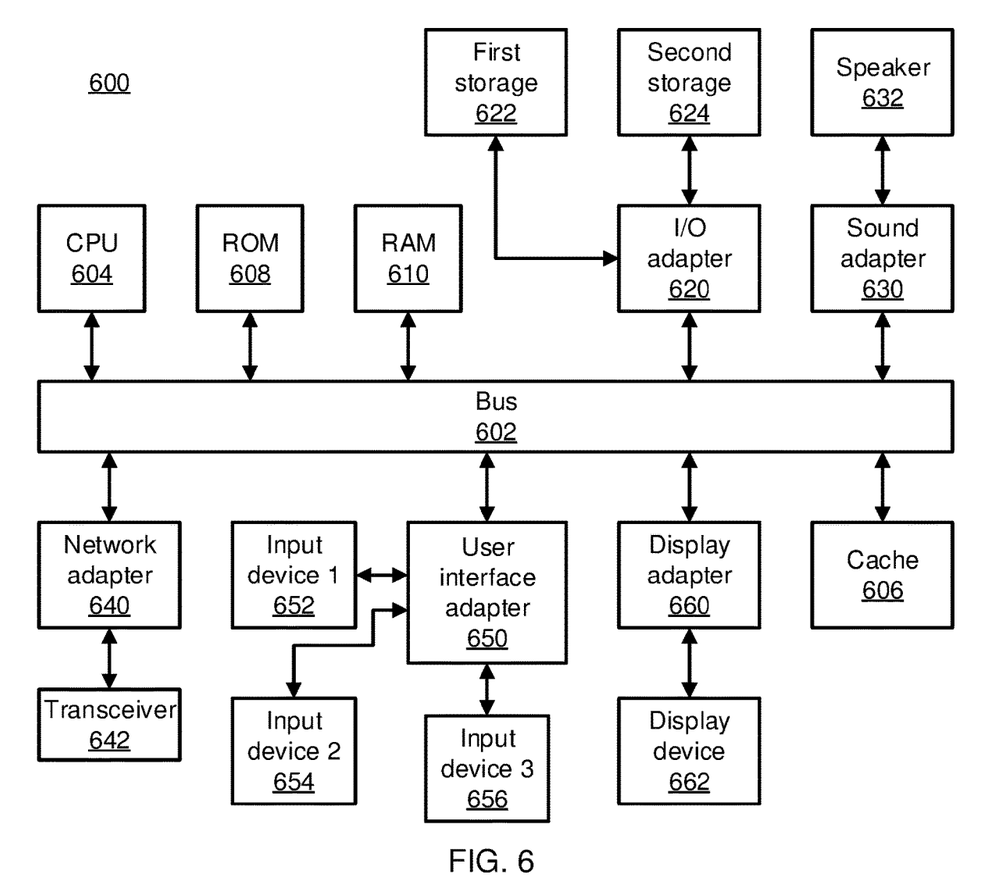
FIG. 6 is a block diagram of a processing system in accordance with an embodiment of the present invention.

Referring now to FIG. 6, an exemplary processing system 600 is shown which may represent the conversation-based information gathering system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
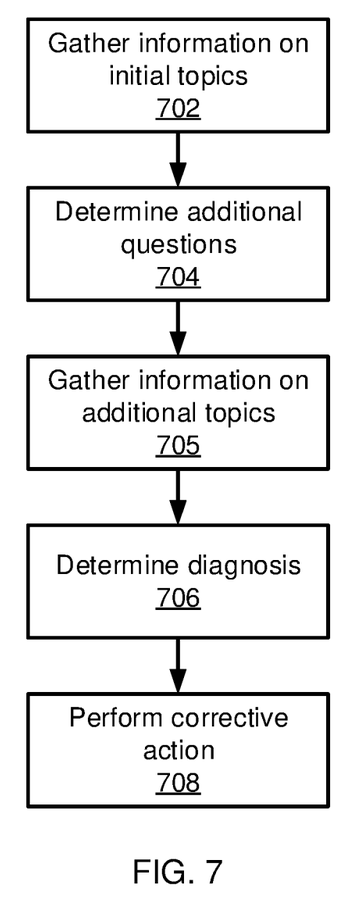
FIG. 7 is a block/flow diagram of a method for gathering information through natural, interactive dialog and assisting a user based on the gathered information in accordance with an embodiment of the present invention.

Referring now to FIG. 7, a method of performing medical diagnosis and treatment is shown. Block 702 gathers information on a set of initial topics, for example gathering basic in information about a user or patient. The initial topics may include, for example, identifying information, medical history, family history, and any signs or symptoms. Block 704 then determines any additional questions that may be needed to make a determination regarding the user or patient's status. For example, if the user's answers to the initial topics indicate a possibility of a particular condition, block 704 determines additional topics to help refine the diagnosis. Block 705 gathers information on the additional topics. This process may be repeated until enough information has been gathered to make a diagnosis.

Block 706 determines the diagnosis based on the gathered information. Any appropriate diagnosis model can be used including, for example, machine learning models, expert domain knowledge decision trees, etc. Block 706 determines the user's status and a corrective action. Block 708 then performs the corrective action. For example, the diagnosis may determine that the user has an infection and that an antibiotic should be administered. Block 708 automatically performs the corrective action by, e.g., administering the antibiotic, issuing a prescription, or instructing a physician regarding the steps to take.

Although the present embodiments have been described in the context of medical information, diagnosis, and action, it should be understood that the interactive dialog systems described herein can be applied toward any appropriate endeavor. Other applications include providing advice on any of a variety of topics, troubleshooting computer systems, and repairing cars, etc. By finding natural transitions between topics, the present embodiments gather the needed information in a manner that the user finds reassuring and comfortable.

Having described preferred embodiments of topic navigation in interactive dialog systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for dynamically managing an interactive dialogue in a digital environment, comprising:
    recursively determining a set of sector points that equally divide a distance between a current topic and a target topic;
    determining, after identifying, the current topic and the target topic, a path through a vector space using a hardware processor, from the current topic to the target topic, the path comprising a set or bridging topics based on topic words that are close to the sector points, where each bridging topic in the path is determined based on a semantic similarity score defined by cosine similarity between word-vectors in a vector space, and is within a threshold distance in the vector space from a previous topic and a subsequent topic;
    conducting an interactive conversation with a user, including accepting inputs from the user via a user interface and providing responses to the user via the user interface, introducing each topic in the path until the target topic has been reached;
    analyzing, using natural language processing (NLP), inputs from the user and responses during the interactive conversation to refine the set of bridging tonics based on contextual relevance; and
    recording at least one predetermined piece of information relating to the inputs from the user and the responses during the interactive conversation for the target topic.

2. The method of claim 1, wherein determining the path from the current tonic to the target topic further comprises determining that the topic words share no common neighbors with the current topic or the target topic.

3. The method of claim 2, wherein determining the path from the current topic to the target topic further comprises incrementing a value that determines which sector points are used and determining new topic words close to new sector points based on the in value.

4. The method of claim 1, wherein determining the path from the current topic to the target topic further comprises determining that the topic words both share common neighbors with the current topic or the target topic.

5. The method of claim 4, wherein determining the path from the current topic to the target topic further comprises identifying topics for the path from the common neighbors shared with the current topic and the target topic.

6. The method of claim 1, wherein determining the path from the current topic to the target topic comprises determining that the current topic and the target topic share at least one common neighbor.

7. The method of claim 6, wherein determining the path from the current topic to the target topic comprises identifying a topic for the path from the at least one common neighbor.

8. The method of claim 1, farther comprising determining a state of the user based on the at least one predetermined piece of information and performing a corrective action based on the determined state of the user.

9. The method of claim 1, wherein conducting an interactive conversation with the user is performed after determining the path.

10. The method of claim 1, wherein a neighborhood around a topic in the vector space includes topics related to the topic.

11. A non-transitory computer readable storage medium comprising a computer readable program for dynamically managing an interactive dialogue in a digital environment, wherein the computer readable program when executed on a computer causes the computer to perform steps of:
    recursively determining a set of sector points that equally divide a distance between a current topic and a target topic;
    determining, after identifying the current topic and the target topic, a path through a semantic vector space, from the current topic to the target topic, the path comprising a set of bridging topics based on topic words that are close to the sector points, where each bridging topic in the path is determined based on a semantic similarity score defined by cosine similarity between word-vectors in a vector space, and is within a threshold distance in the vector space from a previous topic and a subsequent topic;
    conducting an interactive conversation with a user, including accepting inputs from the user via a user interface and providing responses to the user via the user interface, introducing each topic in the path until the target topic has been reached;
    analyzing, using natural language processing (NLP), inputs from the user and responses during the interactive conversation to refine the set of bridging topics based on contextual relevance; and
    recording at least one predetermined piece of information relating to the inputs from the user and the responses during the interactive conversation for the target topic.

12. The non-transitory computer readable storage medium of claim 11, wherein determining the path from the current topic to the target topic further comprises determining that the topic words share no common neighbors with the current topic or the target topic.

13. The non-transitory computer readable storage medium of claim 12, wherein determining the path from the current topic to the target topic further comprises incrementing a value that determines which sector points are used and determining new topic words close to new sector points based on the incremented value.

14. An interactive dialog system, comprising:
    a hardware processor; and
    a memory that stores a computer program, which, when Executed by the Hardware processor, causes the hardware processor to:
        recursively determine a set of sector points that equally divide a distance between a current topic and a target topic;
        determine, after identifying the current topic and the target topic, a path through a vector space, from the current topic to the target topic, that includes a set of bridging topics based on topic words that are close to the sector points, where each bridging topic in the path is d ermined based on a semantic similarity score defined by cosine similarity between word-vectors in a vector space, and is within a threshold distance in the vector space from a previous topic and a subsequent topic;
        conduct an interactive conversation with a user, including accepting inputs front the user via a user interface and providing responses to the user via the user interface, introducing each topic the path until the target topic has been reached;
        analyze, using natural language processing (NLP), from the user and responses during the interactive conversation to refine the set of bridging topics base contextual relevance; and
        record at least one predetermined piece of information relating to the inputs from the user and the responses during the interactive conversation for the target topic.

15. The system of claim 14, wherein the computer program further causes the hardware processor to determine whether the topic words share have common neighbors with the current topic or the target topic.

16. The system of claim 15, wherein the computer program further causes the hardware processor to increment a value that determines which sector points are used and determines new topic words close to new sector points based on the incremented value when the topic words have no common neighbors with the current topic and the target topic.

17. The system of claim 15, wherein the computer program further causes the hardware processor to identify topics for the path from the common neighbors shared with the current topic and the target topic when the topic words both have common neighbors with the current topic or the target topic.

18. The system of claim 14, wherein the computer program further causes the hardware processor to identify a topic for the path from a common neighbor when the current topic and the target topic share at least one common neighbor.

* * * * *